United States Patent [19]
Heinzelman et al.

[11] Patent Number: 5,735,012
[45] Date of Patent: Apr. 7, 1998

[54] RESILIENTLY FLEXIBLE TOOTHBRUSH

[75] Inventors: Bert Davis Heinzelman, Tenafly, N.J.; Donald Richard Lamond, Lynbrook; Diego Fontayne, Montebello, both of N.Y.

[73] Assignee: Chesebrough-Pond's USA Co., Division of Conopco, Inc., Greenwich, Conn.

[21] Appl. No.: 831,151

[22] Filed: Apr. 1, 1997

[51] Int. Cl.$^6$ .................................................... A46B 9/04
[52] U.S. Cl. ............................................ 15/167.1; 15/143.1
[58] Field of Search ............................. 15/143.1, 172, 15/167.1

[56] References Cited

U.S. PATENT DOCUMENTS

| | | |
|---|---|---|
| 758,764 | 5/1904 | Macleod . |
| 4,520,526 | 6/1985 | Peters . |
| 4,829,621 | 5/1989 | Phenegar . |
| 5,054,154 | 10/1991 | Schiffer et al. . |
| 5,105,499 | 4/1992 | Dirksing . |
| 5,146,645 | 9/1992 | Dirksing . |
| 5,323,504 | 6/1994 | McCusker . |
| 5,339,482 | 8/1994 | Desimone ................. 15/167.1 |
| 5,392,483 | 2/1995 | Heinzelman et al. . |
| 5,398,369 | 3/1995 | Heinzelman et al. . |
| 5,465,450 | 11/1995 | Humphries . |
| 5,630,244 | 5/1997 | Chang ...................... 15/167.1 |
| 5,673,452 | 10/1997 | Chang ...................... 15/167.1 |

FOREIGN PATENT DOCUMENTS

| | | |
|---|---|---|
| 405111409 | 5/1993 | Japan . |
| 406165712 | 6/1994 | Japan . |
| 155730 | 9/1932 | Switzerland . |
| 476479 | 12/1937 | United Kingdom . |
| 2 216 785 | 10/1989 | United Kingdom . |
| WO 88/03772 | 6/1988 | WIPO . |
| WO 88/06417 | 9/1988 | WIPO . |
| WO 93/15627 | 8/1993 | WIPO . |
| 9409675 | 5/1995 | WIPO ...................... 15/167.1 |

*Primary Examiner*—Randall Chin
*Attorney, Agent, or Firm*—Milton L. Honig

[57] ABSTRACT

A toothbrush is provided having a brushhead, neck and handle. The handle includes a flex zone flanked on one side by the neck on the other by a tail zone of the handle. The neck and tail zone are rigid in contrast to the bendable flex zone. Spring Rate for the neck and tail zone is each greater than that for the flex zone. A relatively hard, unitarily formed backbone traverses neck and handle. An elastomer forms portions of both the flex and tail zones. Elastomer is anchored through at least one channel traversing a beam of the backbone. Ends of the channel are radiused to eliminate structural weakness.

12 Claims, 1 Drawing Sheet

RESILIENTLY FLEXIBLE TOOTHBRUSH

BACKGROUND OF THE INVENTION

1. Field of the Invention

The invention concerns a toothbrush having a brushhead resiliently flexible relative to its handle.

2. The Related Art

Effective cleaning of teeth and gums normally involves complex maneuvering of a toothbrush. A great many individuals brush primarily in a horizontal and a semi-circular manner. These motions are not the most effective way to clean teeth. Primary among the reasons for individuals resorting to ineffective techniques is that their toothbrushes are not designed to follow the contours of teeth and gum surfaces. The natural horizontal or semi-circular motions can be overcome by individuals practicing better technique. Unfortunately, most brushing takes place in the early morning or just prior to bed time. Concentration on technique is disadvantaged by this proximity to the sleeping state. For all these reasons, there have been numerous attempts at developing toothbrushes which promote correct technique without great reliance upon individual practice.

U.S. Pat. No. 5,465,450 (Humphries) describes a toothbrush having an elongated handle, neck and head part. At least one region of the head part is weakened so as to allow a sharp, discrete deformation complementary to the user's dental arches. Unfortunately the deformations are irreversible. Adaptability to different parts of the mouth at different stages of brushing is an inherent problem.

A variety of elastically deformable neck section toothbrushes have been reported in the literature. These include GB 476,479 (Chiavaro), U.S. Pat. No. 5,323,504 (McCusker), U.S. Pat. No. 758,764 (Macleod), U.S. Pat. No. 4,829,621 (Phenegar), JP 6-165712 (Imasaka et al.), JP 5-111409 (Fukuba), WO 88/03772 (Winderrich) and WO 88/06417 (Mierau et al.).

Resiliency has also been achieved through use of a twin beam structure to connect handle and brushhead. The twin beam structure resists deflection up to a predetermined force determined primarily by material properties and precise geometric configuration. Illustrative of this art is U.S. Pat. No. 5,146,645 (Dirksing), U.S. Pat. No. 5,105,499 (Dirksing) and U.S. Pat. No. 4,520,526 (Peters). A related concept has been the incorporation of a corrugated region in the neck to achieve flexibility. See Swiss Patent 155,730 (Grac), GB 2,216,785 (Halm) and WO 93/15627 (Halm). The latter patent utilizes a flexible resilient core surrounded by a corrugated outer elastomeric region.

U.S. Pat. No. 5,054,154 (Schiffer et al.) describes an elastically flexible segment of a handle to allow deflection of the bristlehead in the event of excessive compression. Deflection is intended to prevent injury to the gums, teeth, bridges and other tooth fasteners. The elastic segment is formed by at least one clearance, slot or slit at least partially filled with elastic polymeric/copolymeric plastic material.

While the Schiffer improvement is a significant advance, certain problems still remain. Foremost is concern with cracking. Unless the combination of materials and their mutual joinder falls within certain critical parameters, unconfined flexibility leads to stress. Cracking results because of the insufficient structural integrity.

Accordingly, it is an object of the present invention to provide a toothbrush with a flexible handle to be gentle on the gums while effectively cleaning teeth.

Still another object of the present invention is to provide a toothbrush with a flexible handle sufficiently resilient to return to its original position.

Another object of the invention is to provide a toothbrush with a flexible handle whose structural integrity is not adversely affected by the resiliency.

Yet another object of the present invention is to provide a toothbrush with a flexible handle constructed of materials and geometry which resists cracking under bending stress.

SUMMARY OF THE INVENTION

A toothbrush is provided that includes:

- a brushhead with a base and bristle tuffs projecting from the base;
- a neck with first and second ends, the neck being connected by its first end to the brushhead; and
- a handle with front and rear ends, the front end being connected to the second end of the neck and including:
  - a flex zone adjacent the front end; and
  - a tail zone adjacent the flex zone and extending toward the rear end, the neck and tail zone each being more rigid to bending than the flex zone such that a Spring Rate of respective neck and tail zone is each greater than the Spring Rate of the flex zone, and the brushhead, neck and handle being unitarily formed from a first rigid plastic backbone, the flex and tail zones additionally being formed at least partially from a resilient elastomer.

Spring Rate is a measure of force applied across a given distance of displacement. Typically the Spring Rate of the flex zone may range from 0.1 to 1, preferably from 0.4 to 0.8, optimally from 0.5 to 0.65 pounds per inch as measured over a test length of 1.450 inches. Neck zone Spring Rates ordinarily will range from greater than 1 pound per inch to 20 pounds per inch, preferably from 1.5 to 15, optimally from 1.7 to 3 pounds per inch over a test length of 2.735 inches. Tail zone Spring Rates ordinarily will range from greater than 1 pound per inch to 20 pounds per inch, preferably from 1.5 to 15, optimally from 1.7 to 3 pounds per inch over a test length of 3.250 inches. The relatively rigid material forming the backbone of the handle is preferably formed of polypropylene having a Shore Hardness ranging from 60 to 110, preferably from 80 to 100. Suitable for this purpose is Novolen 3248 available from the BASF Corporation.

Elastomers of the present invention may be selected from a variety of rubbers, most especially polyolefins. Typical are the styrene-butadiene-styrene, styrene-isoprenestyrene, styrene-ethylene/butylene-styrene and related copolymers. These elastomers should have a Shore Hardness ranging from 20 to 50, preferably from 25 to 35. A preferred elastomer is Kraton® G which is a styrene-ethylene/butylene-styrene copolymer available from the Shell Chemical Company. Again it is to be emphasized that not merely the combination of materials but also their geometric dimensions are determinative of a flex zone according to the present invention. For these reasons, it has been found through considerable experimentation the criticality of the Spring Rate.

Proper joinder of the elastomer and the rigid plastic backbone is an important feature in avoiding stress cracking and separation of materials. Toothbrushes of the present invention are manufactured by injecting the molten elastomer around the rigid backbone. At least one but preferably two or more channels are formed within the backbone through which during manufacture molten elastomer flows in movement from the upper and lower surfaces of the handle. These channels serve to anchor two different types of plastic materials. It is here that structural weakness is often evident.

According to the present invention, channels are formed between walls of the rigid plastic backbone. These channels at either end have a curved radius. Moreover, the radius is raised away from the nominal plane of the backbone immediately adjacent the channel. Advantageously the radius will be no greater than half the thickness of the backbone. For instance, the backbone may have a thickness of 0.110 inches and the radius can be 0.05 inches. Typical radii ranges may be from 0.01 to 0.5, preferably from 0.02 to 0.10, optimally from 0.03 to 0.06 inches. By the radius feature, sharp corners are avoided which in turn improves structural strength. Indeed, the "T" beam construction of the channels has been found to result in a 30-40% decrease in stress over that exhibited by squared-off channels.

BRIEF DESCRIPTION OF THE DRAWING

The above features, advantages and objects of the present invention will more fully be appreciated through the following detailed discussion, reference being made to the drawing in which.

DETAILED DESCRIPTION

Figure 1:
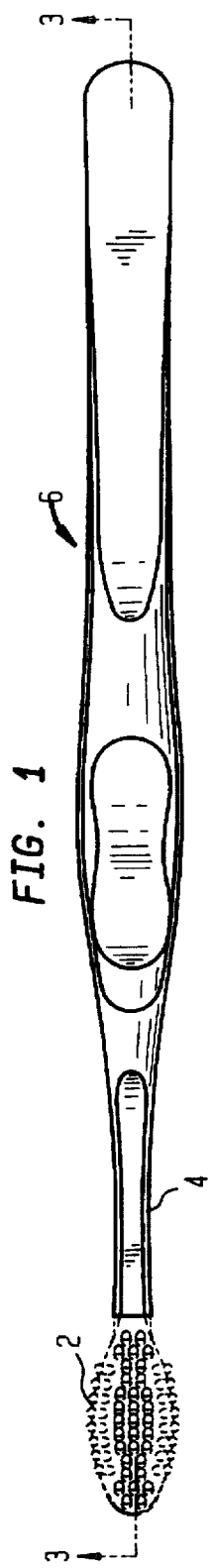
FIG. 1 is a top plan view of toothbrush according to the present invention.
Figure 2:
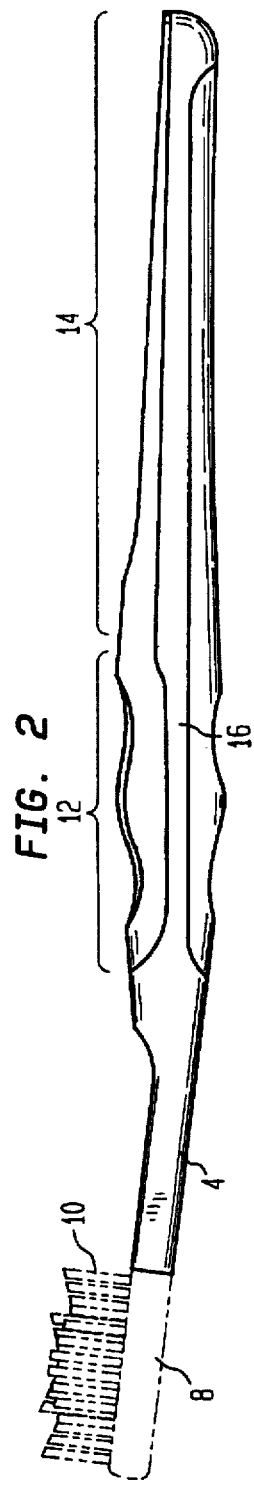
FIG. 2 is a side elevational view of the embodiment according to FIG. 1.

The Figures illustrate a toothbrush that includes a brushhead 2, a neck 4 and a handle 6. The brushhead 2 has a base 8 and a series of bristle tufts 10.

Handle 6 includes a flexible or flex zone 12 adjacent the neck and a tail zone 14 occupying a rear area of the handle. Neck 4 and tail zone 14 are relatively rigid in contrast to the flex zone 12, the latter being bendable when finger pressure is exerted on a surface thereof.

A Flex Test was developed to evaluate relative Spring Rates of the neck, tail zone and flex zone. Samples were evaluated by clamping the tail zone of a toothbrush into a holding block to suspend the brush in a horizontal position. A one pound load was then attached by a string to a center of the brushhead. Deflection from the horizontal plane was then measured. Toothbrushes typical of that shown in the Figures had Spring Rates of approximately 0.54 pounds per inch.

Figure 3:
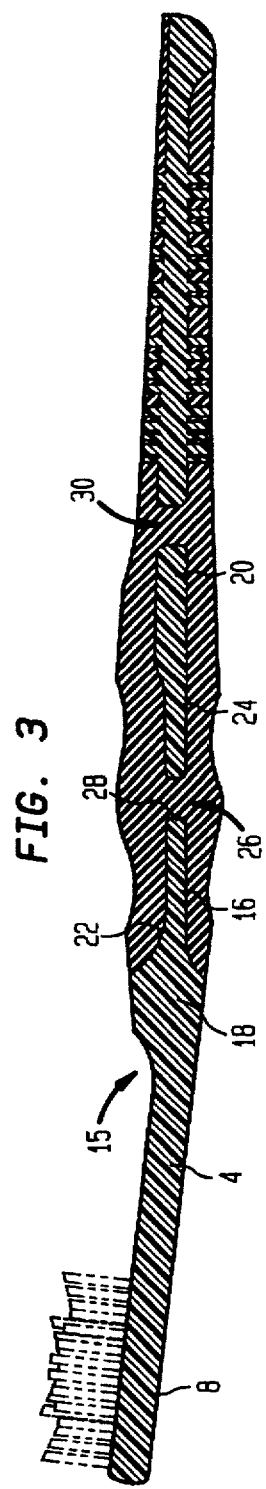
FIG. 3 is a cross sectional view taken along line 3—3 of FIG. 1.

FIG. 3 best illustrates through a cross sectional view the unitarily formed rigid backbone 15. A relatively thin beam 16 section of the backbone traverses through the flex zone. Adjacent neck and tail zone traversing sections 18 and 20 of the backbone, respectively, are of relatively greater thickness than the beam. Beam 16 features an upper and lower surface 22, 24 respectively. A channel 26 in the form of a hole traverses through beam 16. The channel is formed by a pair of walls 28. A similar second channel 30 is formed in the backbone structure supporting the tail zone.

Figure 4:
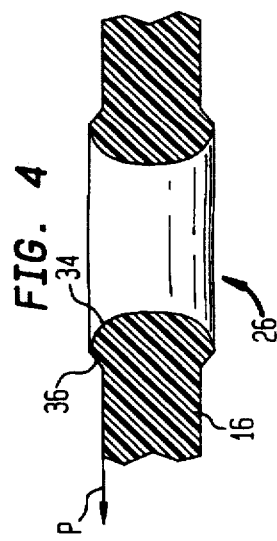
FIG. 4 is an expanded cross sectional view of a channel shown in FIG. 3.

FIG. 4 illustrates in an expanded view channel 26 (and is equivalent to the second channel 30). Walls of the channel are rounded at each of their terminii and exhibit a curved radius 34 at ends thereof. The curved radii 34 are raised locally by addition of material 36 above a nominal plane P that defines the adjacent upper or lower surface of beam 16.

The foregoing description and drawing illustrate selected embodiments of the present invention and in light thereof various modifications will be suggested to one skilled in the art, all of which are within the spirit and purview of this invention.

What is claimed is:

1. A toothbrush comprising:

a brushhead with a base and bristle tufts projecting from the base;

a neck with first and second ends, the neck being connected by the first end to the brushhead; and a handle with front and rear ends, the front end being connected to the second end of the neck and comprising:

a flex zone adjacent the front end; and a tail zone adjacent the flex zone and extending toward the rear end, the neck and tail zone each being more rigid to bending than the flex zone such that a Spring Rate of respective neck and tail zone is each greater than the Spring Rate of the flex zone, the Spring Rate of the flex zone ranging from 0.01 to 1.0 pounds per inch over a test length 1.450 inches, and the brushhead, neck and handle being unitarily formed with a rigid plastic backbone, the flex and tail zones additionally being formed at least partially from a resilient elastomer.

2. The toothbrush according to claim 1 wherein the Spring Rate for the neck zone ranges from greater than 1 pound per inch to 20 pounds per inch over a test length of 2.735 inches.

3. The toothbrush according to claim 1 wherein the Spring Rate for the tail zone ranges from greater than 1 pound per inch to 20 pounds per inch over a test length of 3.250 inches.

4. The toothbrush according to claim 1 wherein the flex zone and the tail zone on an upper surface thereof each include the resilient elastomer covering at least part thereof.

5. The toothbrush according to claim 1 wherein the elastomer has a Shore Hardness less than that of the plastic constituting the backbone.

6. The toothbrush according to claim 5 wherein the backbone along a section within the flex zone constitutes a beam, the beam being thinner than adjacent parts of the backbone traversing the neck and the tail zone.

7. The toothbrush according to claim 1 wherein the backbone has at least one channel traversing therethrough, the channel having walls, the walls terminating at ends of the channel, the walls having a curved radius.

8. The toothbrush according to claim 7 wherein a nominal plane of the beam is immediately adjacent the channel and the curved radius is raised locally with material above the nominal plane of the beam.

9. The toothbrush according to claim 8 wherein the radius is no greater than half of a combined thickness of the beam and locally raised material.

10. A toothbrush comprising:

a brushhead with a base and bristle tufts projecting from the base;

a neck with first and second ends, the neck being connected by the first end to the brushhead; and a handle comprising a beam formed of a rigid plastic with upper and lower surfaces, an elastomer covering at least a part of the upper and lower surfaces, at least one channel traversing through the beam, a nominal plane of the beam being immediately adjacent the channel, the channel having walls, the walls terminating at ends of the channel, the walls having a curved radius and the curved radius being raised locally with material above the nominal plane of the beam.

11. A toothbrush comprising:

a brushhead with a base and bristle tufts projecting from the base;

a neck with first and second ends, the neck being connected by the first end to the brushhead; and a handle with front and rear ends, the front end being connected to the second end of the neck and comprising:

a flex zone adjacent the front end; and a tail zone adjacent the flex zone and extending toward the rear end, the neck and tail zone each being more rigid to bending than the flex zone such that a Spring Rate of respective neck and tail zone is each greater than the Spring Rate of the flex zone, the Spring Rate for the neck zone ranging from greater than 1 pound per inch to 20 pounds per inch over a test length of 2.735 inches, and the brushhead, neck and handle being unitarily formed with a rigid plastic backbone, the flex and tail zones additionally being formed at least partially from a resilient elastomer.

12. A toothbrush comprising:

a brushhead with a base and bristle tufts projecting from the base;

a neck with first and second ends, the neck being connected by the first end to the brushhead; and a handle with front and rear ends, the front end being connected to the second end of the neck and comprising:

a flex zone adjacent the front end; and a tail zone adjacent the flex zone and extending toward the rear end, the neck and tail zone each being more rigid to bending than the flex zone such that a Spring Rate of respective neck and tail zone is each greater than the Spring Rate of the flex zone, the Spring Rate for the tail zone ranging from greater than 1 pound per inch to 20 pounds per inch over a test length of 3.250 inches, and the brushhead, neck and handle being unitarily formed with a rigid plastic backbone, the flex and tail zones additionally being formed at least partially from a resilient elastomer.

\* \* \* \* \*